(12) United States Patent
Yasuda et al.

(10) Patent No.: US 9,382,946 B2
(45) Date of Patent: Jul. 5, 2016

(54) SPLIT CAGE AND ROLLER BEARING

(71) Applicant: JTEKT CORPORATION, Osaka-shi, Osaka (JP)

(72) Inventors: Hirotaka Yasuda, Kashihara (JP); Ryohei Hosaka, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 22 days.

(21) Appl. No.: 14/543,211

(22) Filed: Nov. 17, 2014

(65) Prior Publication Data
US 2015/0147016 A1 May 28, 2015

(30) Foreign Application Priority Data

Nov. 25, 2013 (JP) ................................ 2013-242806
Mar. 24, 2014 (JP) ................................ 2014-060364

(51) Int. Cl.
| F16C 33/46 | (2006.01) |
| F16C 33/51 | (2006.01) |
| F16C 19/36 | (2006.01) |
| F16C 33/58 | (2006.01) |

(52) U.S. Cl.
CPC ............ *F16C 33/467* (2013.01); *F16C 19/364* (2013.01); *F16C 33/4605* (2013.01); *F16C 33/4676* (2013.01); *F16C 33/51* (2013.01); *F16C 33/513* (2013.01); *F16C 33/585* (2013.01)

(58) Field of Classification Search
CPC .. F16C 33/46; F16C 33/4694; F16C 33/4605; F16C 33/467; F16C 33/4676; F16C 33/51; F16C 33/513; F16C 33/366; F16C 33/502; F16C 33/586; F16C 19/26; F16C 19/364; B21D 53/12
See application file for complete search history.

(56) References Cited

U.S. PATENT DOCUMENTS

| 2,946,633 | A | * | 7/1960 | Gothberg | ................. | F16C 19/30 |
| | | | | | | 29/898.061 |
| 3,075,278 | A | * | 1/1963 | Bratt | .................... | F16C 33/3856 |
| | | | | | | 29/898.064 |
| 3,501,212 | A | * | 3/1970 | Husten | ..................... | F16C 19/30 |
| | | | | | | 384/614 |
| 3,899,221 | A | * | 8/1975 | Batt | ......................... | F16C 33/51 |
| | | | | | | 384/308 |

(Continued)

FOREIGN PATENT DOCUMENTS

| DE | 79 35 207 U1 | 3/1980 |
| DE | 3509190 A1 | 9/1986 |

(Continued)

OTHER PUBLICATIONS

Apr. 2, 2015 Extended Search Report issued in European Application No. EP 14 19 4074.

*Primary Examiner* — Alan B Waits
(74) *Attorney, Agent, or Firm* — Oliff PLC

(57) ABSTRACT

A split cage includes a plurality of cage segments each having a pair of rim portions and a pair of cage bar portions, the cage bar portions and the rim portions defining a single pocket that accommodates a single tapered roller. Turning of each of the cage segments is guided by the tapered roller, the cage segments being arranged in a circular pattern along the circumferential direction of the split cage, in an annular space between inner and outer rings. Each cage segment has projections formed so as to project radially inward and formed at the rim portions. A projecting length of each projection is set to such a length that the projection is brought into contact with an outer peripheral side portion of the inner ring when the cage segment starts rotating.

20 Claims, 17 Drawing Sheets

(56) References Cited

U.S. PATENT DOCUMENTS

| | | | | |
|---|---|---|---|---|
| 4,557,614 | A * | 12/1985 | Knappe | F16C 19/26 384/573 |
| 4,707,152 | A * | 11/1987 | Neese | F16C 19/364 384/572 |
| 4,728,204 | A * | 3/1988 | Colanzi | B61F 15/12 384/564 |
| 5,772,338 | A * | 6/1998 | Hillmann | F16C 33/4605 384/470 |
| 6,543,938 | B2 * | 4/2003 | Dittenhofer | F16C 19/381 384/455 |
| 6,579,011 | B2 * | 6/2003 | Muschiol | F16C 19/26 384/450 |
| 6,742,934 | B2 * | 6/2004 | Matsuyama | F16C 33/3856 384/572 |
| 7,712,966 | B2 * | 5/2010 | Tsumori | F16C 19/26 384/450 |
| 7,771,122 | B2 * | 8/2010 | Nagai | F16C 33/4605 384/470 |
| 8,794,845 | B2 * | 8/2014 | Beck | F16C 33/4664 384/573 |
| 2015/0043862 | A1 * | 2/2015 | Kajikawa | F16C 33/4676 384/572 |

FOREIGN PATENT DOCUMENTS

| | | | | |
|---|---|---|---|---|
| DE | 102005009980 B3 | 6/2006 | | |
| DE | 112011102719 T5 | 6/2013 | | |
| JP | 2009-024840 A | 2/2009 | | |
| JP | A-2011-133061 | 7/2011 | | |
| JP | WO 2012023437 A1 * | 2/2012 | | F16C 33/4605 |
| JP | WO 2013191238 A1 * | 12/2013 | | F16C 33/6614 |
| SE | CH 376724 A * | 4/1964 | | F16C 33/4611 |

* cited by examiner

SPLIT CAGE AND ROLLER BEARING

INCORPORATION BY REFERENCE

The disclosure of Japanese Patent Applications No. 2013-242806 filed on Nov. 25, 2013 and No. 2014-060364 filed on Mar. 24, 2014, each including the specification, drawings and abstract, is incorporated herein by reference in its entirety.

BACKGROUND OF THE INVENTION

1. Field of the Invention

The invention relates to a split cage and a roller bearing.

2. Description of the Related Art

As a cage that holds a plurality of rollers, which roll between an inner ring and an outer ring of a roller bearing, at prescribed intervals along the circumferential direction of the cage, there is a conventional split cage formed of a plurality of cage segments arranged in a circular pattern along the circumferential direction and each having a single pocket that accommodates a single roller (refer to, for example, Japanese Patent Application Publication No. 2011-133061). As this type of split cage, there is often adopted a cage of a roller guidance type, of which the turning is guided by rollers in order to prevent abrasion of the cage due to contact with inner and outer rings.

In the split cage of the roller guidance type described above, turning of each cage segment is guided by a single roller accommodated in a single pocket of the cage segment. Thus, when there is a large clearance between the cage segments adjacent to each other in the circumferential direction, each cage segment easily rotates about the axis of the corresponding roller. As a result, there is a possibility that each cage segment may be entangled with the corresponding roller due to rotation of the cage segment to cause breakage of the cage segment.

SUMMARY OF THE INVENTION

One object of the invention is to provide a split cage and a roller bearing that are configured to prevent a cage segment from being entangled with a roller due to rotation of the cage segment to cause breakage of the cage segment.

An aspect of the invention relates to a split cage including a plurality of cage segments, each of the cage segments having a pair of rim portions that face each other at a prescribed distance in an axial direction of the split cage, and a pair of cage bar portions disposed between the rim portions to connect the rim portions to each other, the cage bar portions and the rim portions defining a single pocket that accommodates a single roller. Turning of each of the cage segments is guided by the roller, the cage segments being arranged in a circular pattern along a circumferential direction of the split cage, in an annular space between an inner ring and an outer ring. Each of the cage segments has projections formed so as to project toward at least one of a radially outside and a radially inside, the projections being formed at both the rim portions and the cage bar portions, or at the rim portions or the cage bar portions. A projecting length of each of the projections is set to such a length that the projections are brought into contact with an outer peripheral side portion of the inner ring or an inner peripheral side portion of the outer ring, toward which the projections project, when the cage segment starts rotating.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A and FIG. 6B illustrate the state where the cage segment starts rotating in one direction, wherein FIG. 6A is a side view and FIG. 6B is a sectional view;

FIG. 7A and FIG. 7B illustrate the state where the cage segment starts rotating in the other direction, wherein FIG. 7A is a side view and FIG. 7B is a sectional view;

FIG. 8A and FIG. 8B illustrate the state where the cage segment is displaced radially inward, wherein FIG. 8A is a side view and FIG. 8B is a sectional view;

DETAILED DESCRIPTION OF EMBODIMENTS

Figure 1:
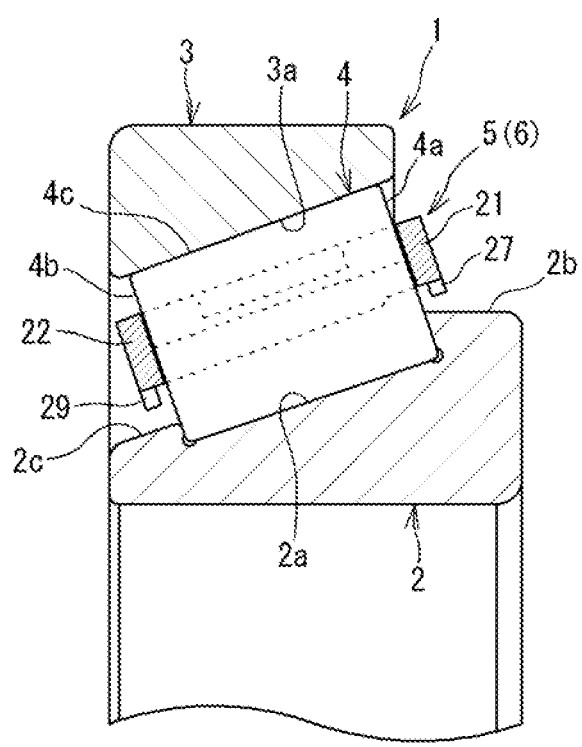
FIG. 1 is a sectional view illustrating main portions of a tapered roller bearing provided with a split cage according to a first embodiment of the invention.

Hereinafter, example embodiments of the invention will be described in detail with reference to the accompanying drawings. FIG. 1 is a sectional view illustrating main portions of a tapered roller bearing 1 provided with a split cage 5 according to a first embodiment of the invention. The tapered roller bearing 1 according to the present embodiment includes an inner ring 2, an outer ring 3, a plurality of tapered rollers 4 and the split cage 5. The tapered rollers 4 are rollably disposed in an annular space between the inner ring 2 and the outer ring 3. The split cage 5 holds the tapered rollers 4.

The inner periphery of the outer ring 3 has an outer ring raceway surface 3a, which is a tapered face, such that the tapered rollers 4 roll. The outer periphery of the inner ring 2 has an inner ring raceway surface 2a, which is a taped face, at such a position that the inner ring raceway surface 2a faces the outer ring raceway surface 3a such that the tapered rollers 4 roll. Lubricant such as grease is applied to the total circumference of each of the outer ring raceway surface 3a and the inner ring raceway surface 2a. The outer periphery of the inner ring 2 has a large rib portion 2b and a small rib portion 2c disposed across the inner ring raceway surface 2a. The large rib portion 2b projects radially outward and is in contact with a first end face 4a of the tapered roller 4, which is located on one side in the axial direction. The small rib portion 2c projects radially outward and may be in contact with a second end face 4b of the tapered roller 4, which is located on the other side in the axial direction.

Figure 2:
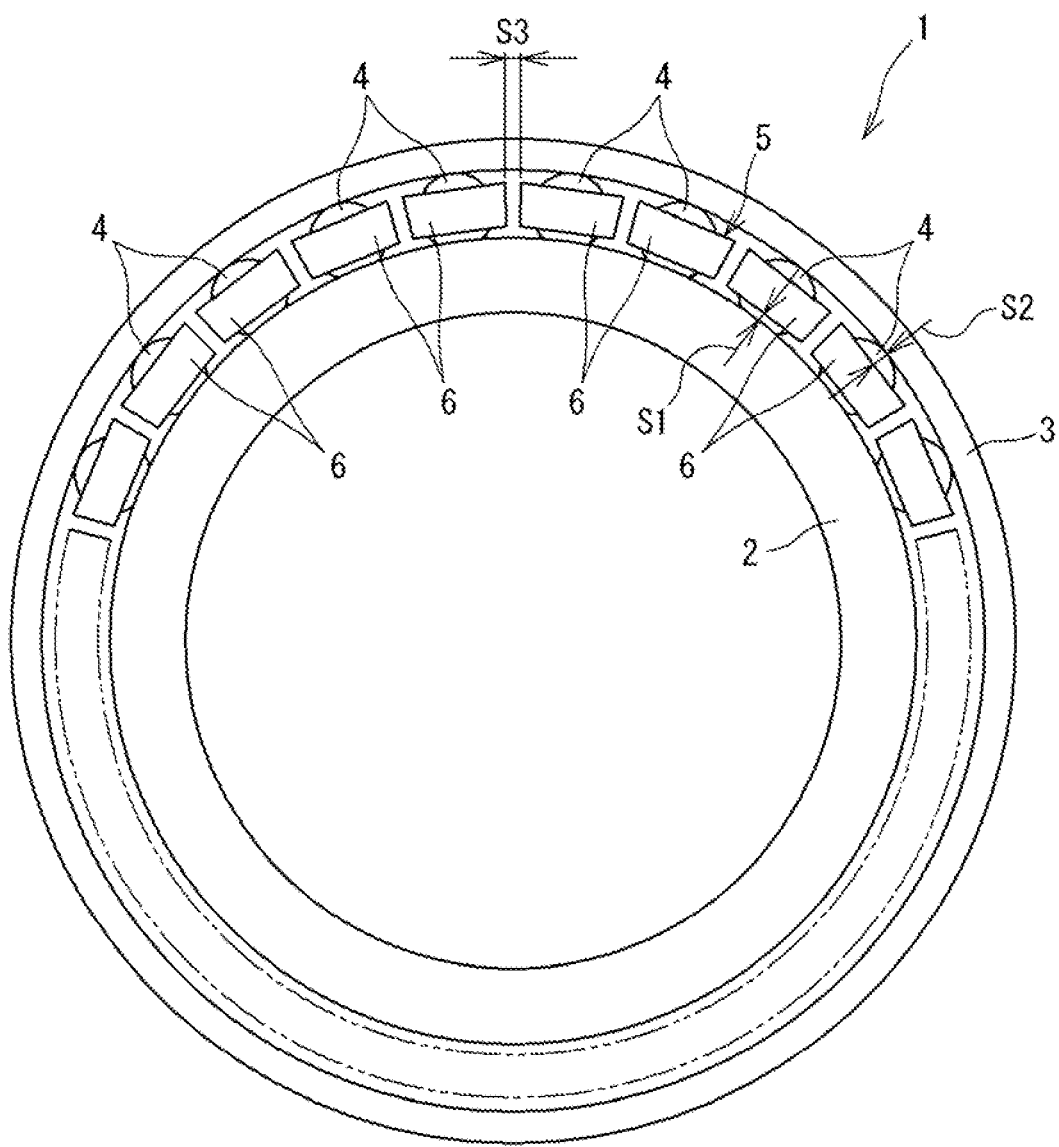
FIG. 2 is a side view illustrating the tapered roller bearing.
Figure 3:
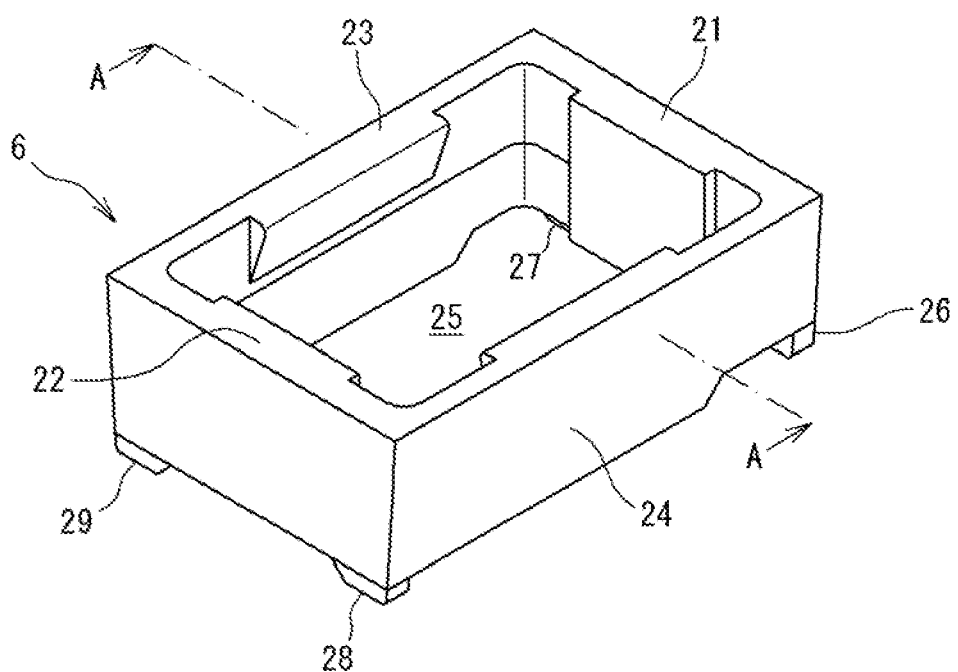
FIG. 3 is a perspective view illustrating one of cage segments that constitute the split cage.

FIG. 2 is a side view illustrating the tapered roller bearing 1. FIG. 3 is a perspective view illustrating one of cage segments 6 that constitute the split cage 5. The split cage 5 is formed by arranging, in a circular pattern, a plurality of the cage segments 6 along the circumferential direction in an annular space between the inner ring 2 and the outer ring 3. Turning of each cage segment 6 is guided by the tapered roller 4. That is, each cage segment 6 is positioned in the radial direction and the axial direction by the tapered roller 4. The tapered roller bearing 1 in the present embodiment is a tapered roller bearing of "roller guidance" type. Thus, a prescribed clearance S1 in the radial direction is formed between the radially inner face of each of the cage segments 6 and the outer peripheral face of the inner ring 2, and a prescribed clearance S2 in the radial direction is formed between the radially outer face of each of the cage segments 6 and the inner peripheral face of the outer ring 3. In addition, a prescribed clearance S3 in the circumferential direction is formed between the cage segments 6 that are adjacent to each other.

Each cage segment 6 is a single-piece member formed by molding synthetic resin into a rectangular frame shape by injection molding. The inner ring 2, the outer ring 3 and the tapered rollers 4 are made of steel such as bearing steel. Each cage segment 6 has a first rim portion 21, a second rim portion 22, a first cage bar portion 23, and a second cage bar portion 24. The first rim portion 21 and the second rim portion 22 face each other at a prescribed distance in the axial direction. Each of the first cage bar portion 23 and the second cage bar portion 24 is disposed between the first rim portion 21 and the second rim portion 22 to connect the first rim portion 21 and the second rim portion 22 to each other. Each cage segment 6 has a single pocket 25 that accommodates a single tapered roller 4, and that is defined by the rim portions 21, 22, and the cage bar portions 23, 24.

Figure 4:
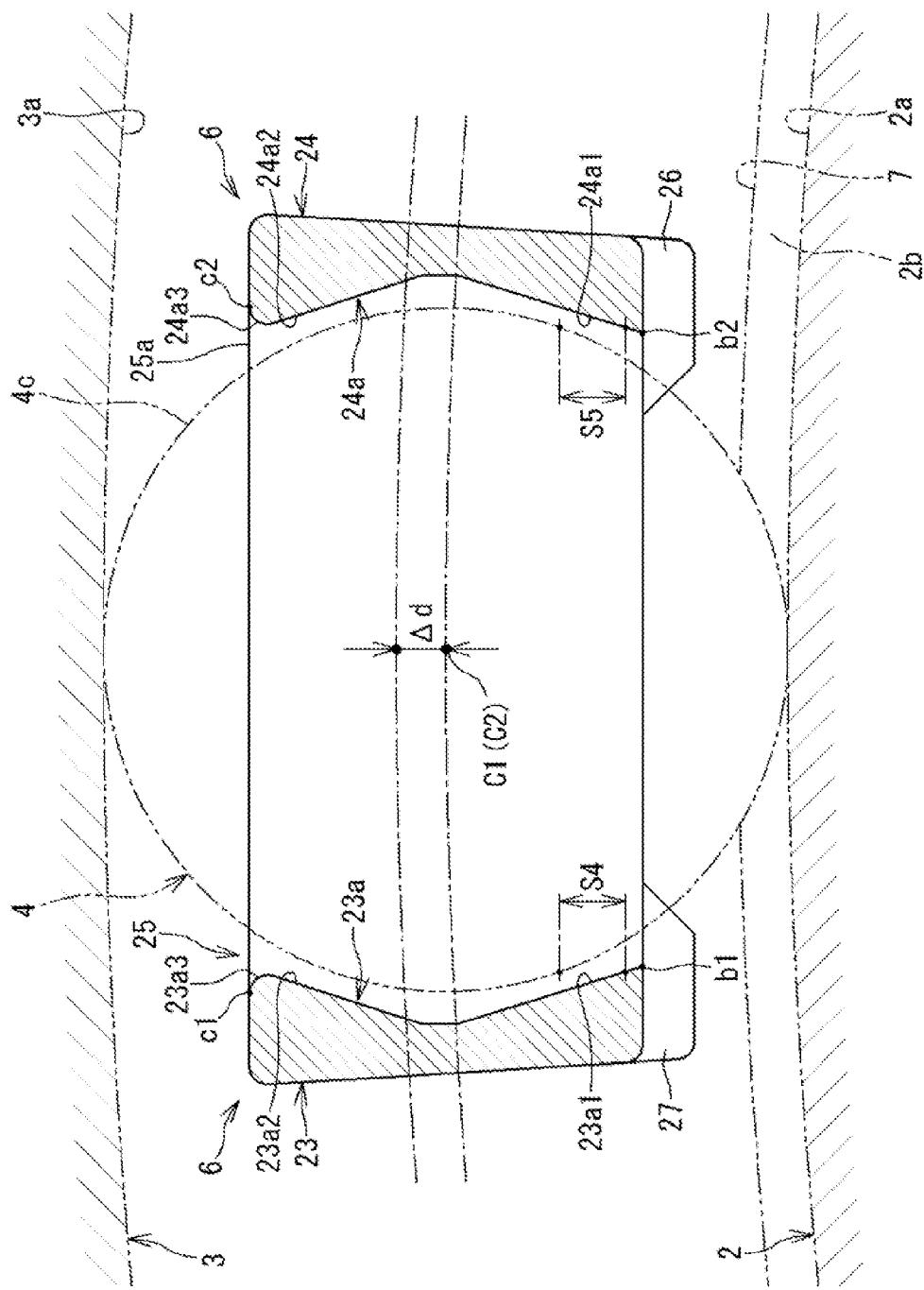
FIG. 4 is a sectional view taken along the line A-A in FIG. 3.

FIG. 4 is a sectional view taken along the line A-A in FIG. 3. As illustrated in FIG. 3 and FIG. 4, an insertion opening 25a is formed at a radially outer side portion of the pocket 25, and the tapered roller 4 is inserted, from the radially outside, into the pocket 25 through the insertion opening 25a. The cage bar portions 23, 24 have pocket-side faces 23a, 24a (described later), respectively, and roundly-chamfered portions 23a3, 24a3 are formed at radially outer end portions of the pocket-side faces 23a, 24a, respectively, to allow the tapered roller 4 to be easily inserted into the pocket 25 through the insertion opening 25a.

Pocket 25-side side faces of the cage bar portions 23, 24 are respectively used as the pocket-side faces 23a, 24a that can be in sliding contact with an outer peripheral face 4c of the tapered roller 4. The pocket-side faces 23a, 24a have inner tilted faces 23a1, 24a1, and outer tilted faces 23a2, 24a2 that are located radially outward of the inner tilted faces 23a1, 24a1, respectively.

The inner tilted faces 23a1, 24a1 are formed so as to be tilted such that part of each of the inner tilted faces 23a1, 24a1 except radially inner ends b1, b2 of the pocket-side faces 23a, 24a is in line contact with the outer peripheral face 4c of the tapered roller 4. The outer tilted faces 23a2, 24a2 are formed so as to be tilted such that part of each of the outer tilted faces 23a2, 24a2 except radially outer ends c1, c2 of the pocket-side faces 23a, 24a is in line contact with the outer peripheral face 4c of the tapered roller 4.

Thus, in normal times, the outer peripheral face 4c of the tapered roller 4 is brought into contact with the inner tilted faces 23a1, 24a1 and the outer tilted face 23a2, 24a2, and it is therefore possible to prevent the tapered roller 4 from being brought into contact with the radially inner ends b1, b2 and the radially outer ends c1, c2 of the pocket-side faces 23a, 24a. As a result, it is possible to prevent breakage of the cage segment 6 due to contact of the tapered roller 4 with the radially inner ends b1, b2 and the radially outer ends c1, c2 of the pocket-side faces 23a, 24a. The tilted faces 23a1, 24a1, 23a2, 24a2 are brought into contact with the outer peripheral face 4c of the tapered roller 4 to allow the tapered roller 4 to position the cage segment 6 in the radial direction.

As illustrated in FIG. 4, radial clearances S4, S5 are formed between the inner tilted faces 23a1, 24a1 that are radially inner portions of the pocket-side faces 23a, 24a, respectively, and the outer peripheral face 4c of the tapered roller 4. The radial clearances S4, S5 are each set larger than a change amount Δd of a pitch circle radius of the cage segment 6 when the cage segment 6 is displaced radially outward (upward in FIG. 4) due to thermal expansion.

Figure 5:
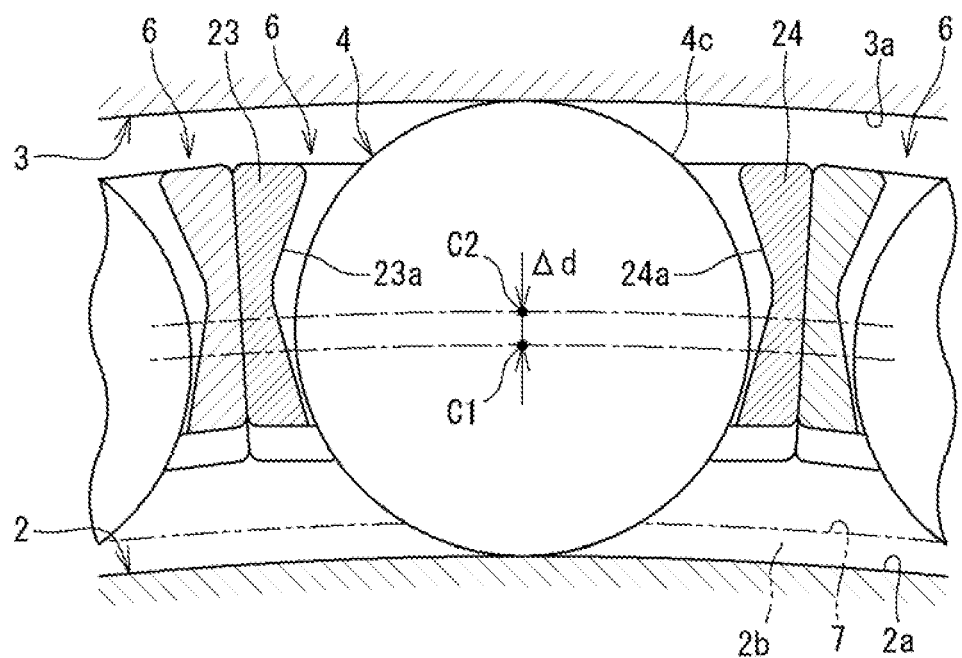
FIG. 5 is a sectional view illustrating the state where the cage segment is displaced radially outward due to thermal expansion.

As a result, as illustrated in FIG. 5, even if the cage segment 6 is displaced radially outward by the change amount Δd due to thermal expansion, a radial clearance still remains between the inner tilted faces 23a1, 24a1 of the pocket-side faces 23a, 24a and the outer peripheral face 4c of the tapered roller 4. Thus, it is possible to prevent the inner tilted faces 23a1, 24a1 from being pushed by the outer peripheral face 4c of the tapered roller 4. Thus, even if clearance loss occurs, that is, the clearance S3 between the adjacent cage segments 6 in the circumferential direction (refer to FIG. 2) is eliminated due to thermal expansion of the cage segments 6 and the cage segment 6 is displaced radially outward, it is possible to prevent occurrence of abnormal abrasion of the pocket-side faces 23a, 24a of the cage segment 6.

As illustrated in FIG. 3, a first projection 26 and a second projection 27 that project radially inward are formed integrally with respective longitudinal (circumferential) end portions of the radially inner face of the first rim portion 21 of the cage segment 6. Similarly, a third projection 28 and a fourth projection 29 that project radially inward are formed integrally with respective longitudinal (circumferential) end portions of the radially inner face of the second rim portion 22 of the cage segment 6.

Figure 6A:
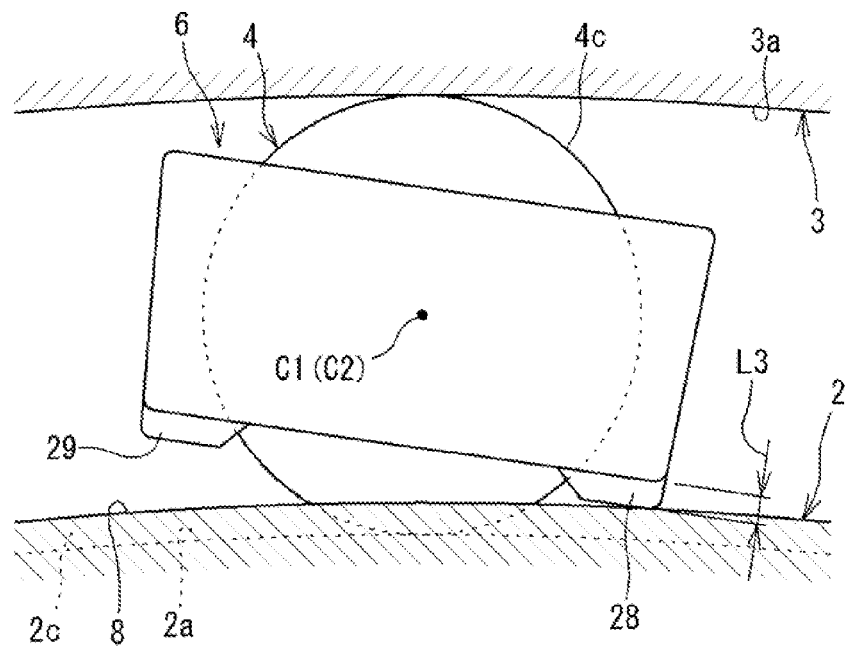
Figure 6B:
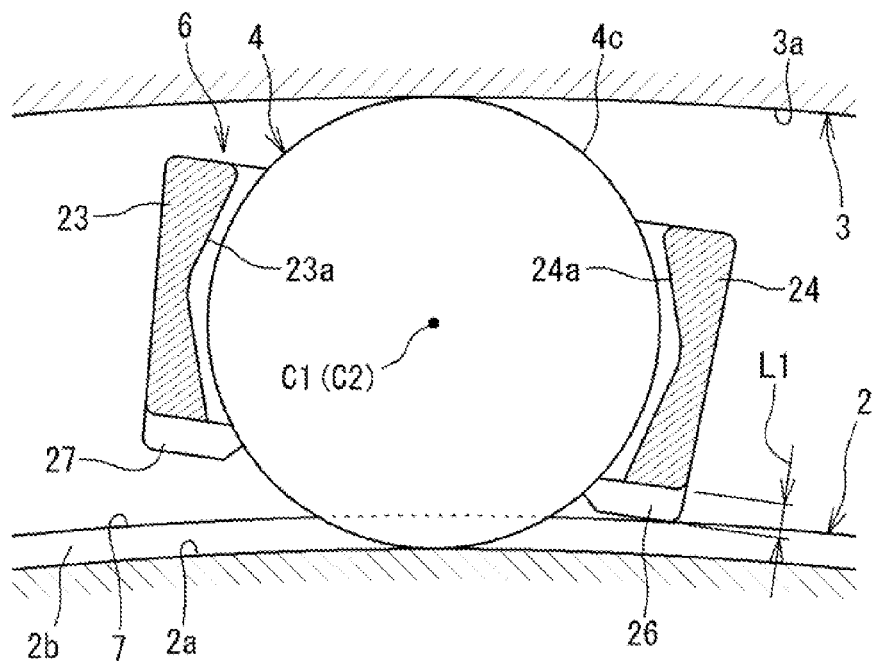

FIG. 6A and FIG. 6B illustrate the state where the cage segment 6 starts rotating in one direction. FIG. 6A is a side view, and FIG. 6B is a sectional view. As illustrated in FIG. 6B, a projecting length L1 of the first projection 26 is set to such a length that the first projection 26 is brought into contact with the outer peripheral face (contact face 7) of the large rib portion 2b of the inner ring 2 when the cage segment 6 starts rotating in one direction (clockwise direction in FIG. 6B) about the axis of the tapered roller 4. In addition, as illustrated in FIG. 6A, a projecting length L3 of the third projection 28 is set to such a length that the third projection 28 is brought into contact with the outer peripheral face (contact face 8) of the small rib portion 2c of the inner ring 2 when the cage segment 6 starts rotating in the one direction.

Thus, when the cage segment 6 starts rotating in the one direction, the first projection 26 and the third projection 28 are brought into contact with the outer peripheral faces (contact faces 7, 8) of the large rib portion 2b and the small rib portion 2c of the inner ring 2, respectively. As a result, it is possible to prevent the cage segment 6 from further rotating in the one direction. Thus, it is possible to prevent the cage segment 6 from being entangled with the tapered roller 4 due to the rotation of the cage segment 6 to cause breakage of the cage segment 6.

Figure 7A:
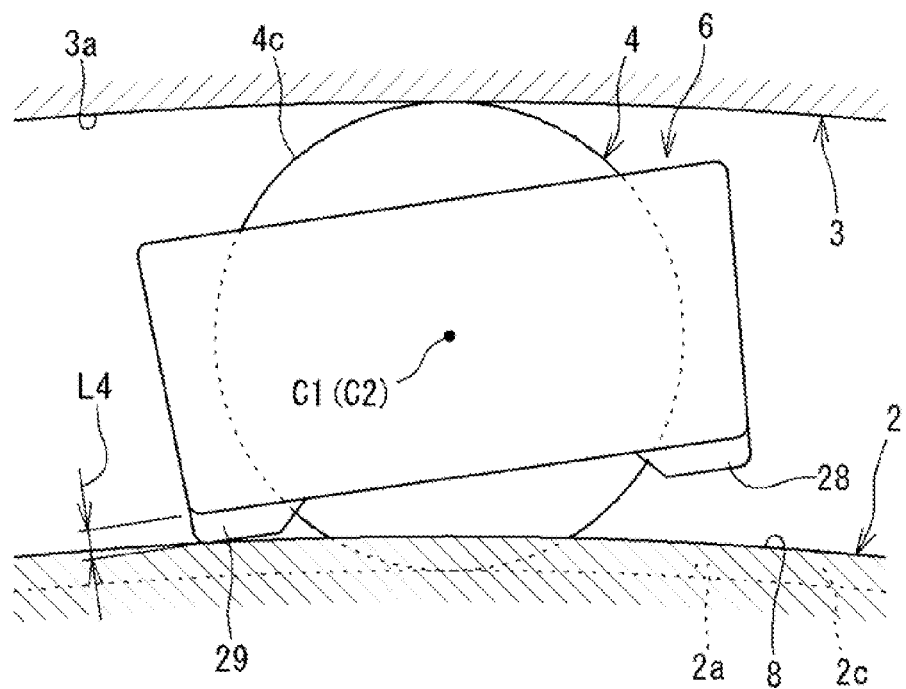
Figure 7B:
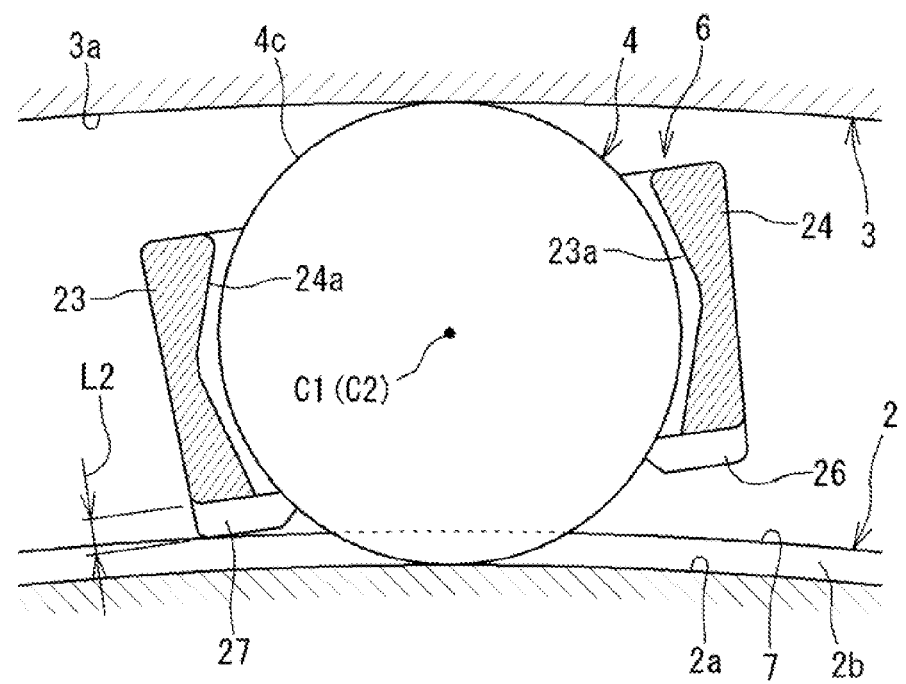

FIG. 7A and FIG. 7B illustrate the state where the cage segment 6 starts rotating in the other direction. FIG. 7A is a side view, and FIG. 7B is a sectional view. As illustrated in FIG. 7B, a projecting length L2 of the second projection 27 is set to such a length that the second projection 27 is brought into contact with the outer peripheral face (contact face 7) of the large rib portion 2b of the inner ring 2 when the cage segment 6 starts rotating in the other direction (counterclockwise direction in FIG. 7B) about the axis of the tapered roller 4. In addition, as illustrated in FIG. 7A, a projecting length L4 of the fourth projection 29 is set to such a length that the fourth projection 29 is brought into contact with the outer peripheral face (contact face 8) of the small rib portion 2c of the inner ring 2 when the cage segment 6 starts rotating in the other direction.

Thus, when the cage segment 6 starts rotating in the other direction, the second projection 27 and the fourth projection 29 are brought into contact with the outer peripheral faces (contact faces 7, 8) of the large rib portion 2b and the small rib portion 2c of the inner ring 2, respectively. As a result, it is possible to prevent the cage segment 6 from further rotating in the other direction. Thus, it is possible to prevent the cage segment 6 from being entangled with the tapered roller 4 due to the rotation of the cage segment 6 to cause breakage of the cage segment 6.

Figure 8A:
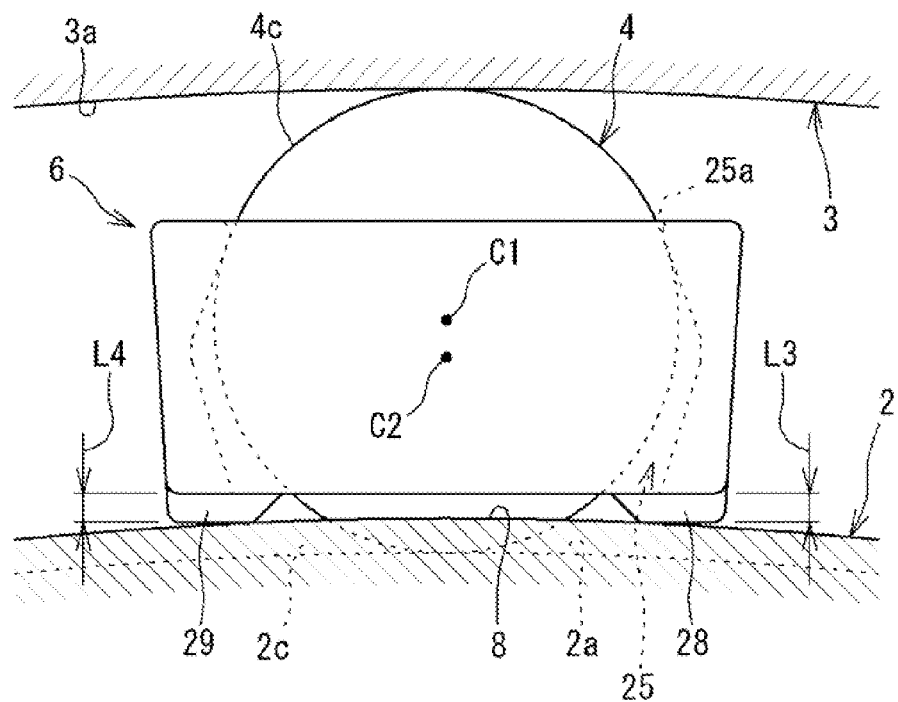
Figure 8B:
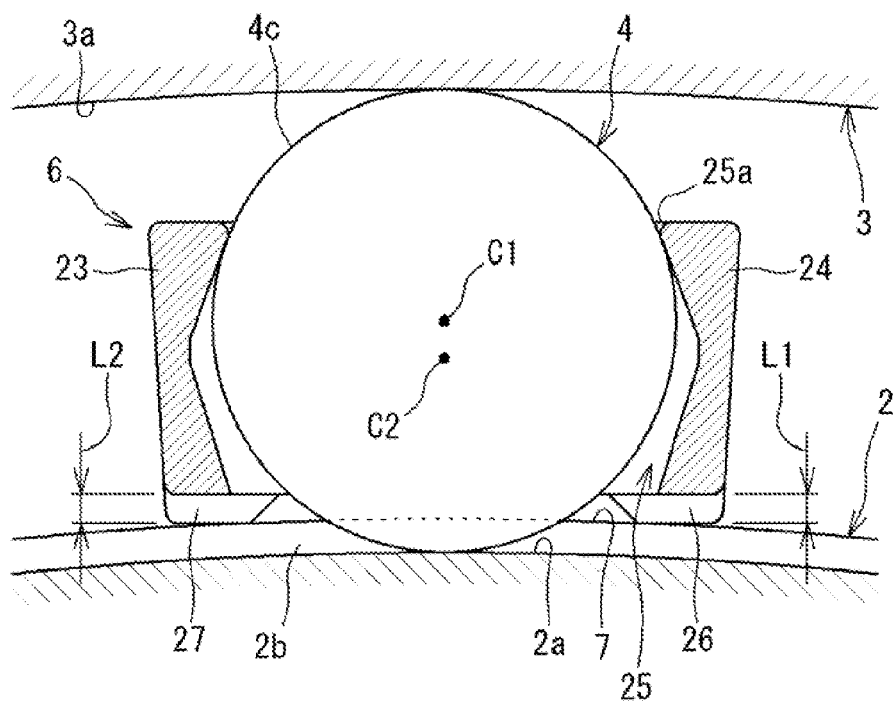

FIG. 8A and FIG. 8B illustrate the state where the cage segment 6 is displaced radially inward. FIG. 8A is a side view, and FIG. 8B is a sectional view. Each of the projecting lengths L1, L2 of the first and second projections 26, 27 is set as follows. That is, as illustrated in FIG. 8B, each of the projecting lengths L1, L2 is set to such a length that the first and second projections 26, 27 are brought into contact with the outer peripheral face (contact face 7) of the large rib portion 2b of the inner ring 2 before the cage segment 6 is detached from the tapered roller 4, when the cage segment 6 is displaced radially inward, that is, when the insertion opening 25a of the pocket 25 is displaced in such a direction that the tapered roller 4 comes out of the insertion opening 25a. Similarly, as illustrated in FIG. 8A, each of the projecting lengths L3, L4 of the third and fourth projections 28, 29 is set to such a length that the third and fourth projections 28, 29 are brought into contact with the outer peripheral face (contact face 8) of the small rib portion 2c of the inner ring 2 before the cage segment 6 is detached from the tapered roller 4, when the cage segment 6 is displaced radially inward.

Thus, when the cage segment 6 is displaced radially inward due to, for example, vibrations, the first and second projections 26, 27 and the third and fourth projections 28, 29 are brought into contact with the outer peripheral face (contact face 7) of the large rib portion 2b of the inner ring 2 and the outer peripheral face (contact face 8) of the small rib portion 2c of the inner ring 2, respectively, before the cage segment 6 is detached from the tapered roller 4. As a result, it is possible to prevent the cage segment 6 from being detached from the tapered roller 4 to cause breakage of the cage segment 6.

When the cage segment 6 starts rotating, or when the cage segment 6 is displaced radially inward due to, for example, vibrations, the first and second projections 26, 27 and the third and fourth projections 28, 29 are brought into contact with the outer peripheral face (contact face 7) of the large rib portion 2b of the inner ring 2 and the outer peripheral face (contact face 8) of the small rib portion 2c of the inner ring 2, respectively, Thus, it is possible to prevent lubricant on the inner ring raceway surface 2a from being peeled off by the first to fourth projections 26 to 29.

Figure 9:
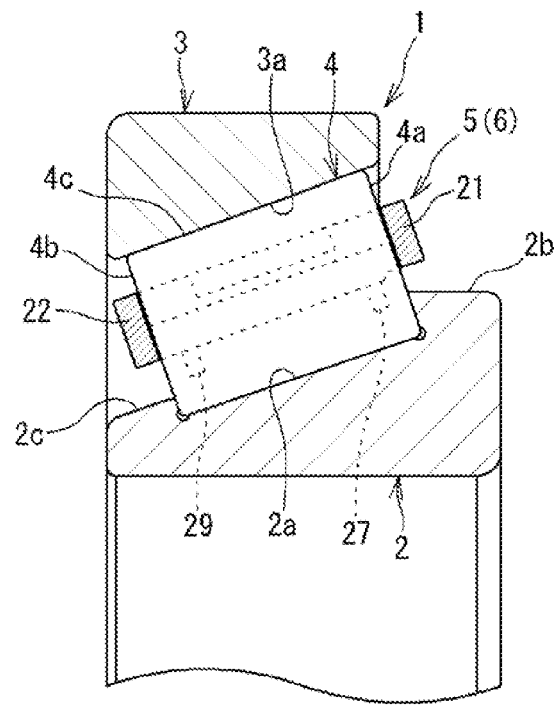
FIG. 9 is a sectional view illustrating main portions of a tapered roller bearing provided with a split cage according to a second embodiment of the invention.
Figure 10:
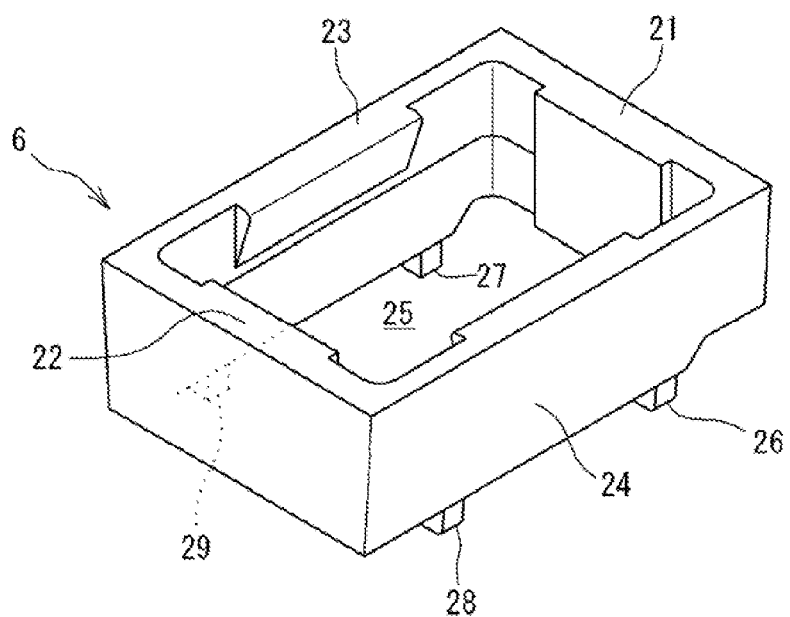
FIG. 10 is a perspective view illustrating one of cage segments that constitute the split cage according to the second embodiment.

FIG. 9 is a sectional view illustrating main portions of a tapered roller bearing 1 provided with a split cage 5 according to a second embodiment of the invention. FIG. 10 is a perspective view illustrating one of cage segments 6 that constitute the split cage 5. In the cage segment 6 according to the present embodiment, first and third projections 26, 28 and second and fourth projections 27, 29 are formed so as to project from the radially inner face of the second cage bar portion 24 and the radially inner face of the first cage bar portion 23, respectively. Specifically, the second projection 27 and the fourth projection 29 that project radially inward are formed integrally with respective longitudinal (axial) end portions of the radially inner face of the first cage bar portion 23. Similarly, the first projection 26 and the third projection 28 that project radially inward are formed integrally with respective longitudinal (axial) end portions of the radially inner face of the second cage bar portion 24.

Figure 11A:
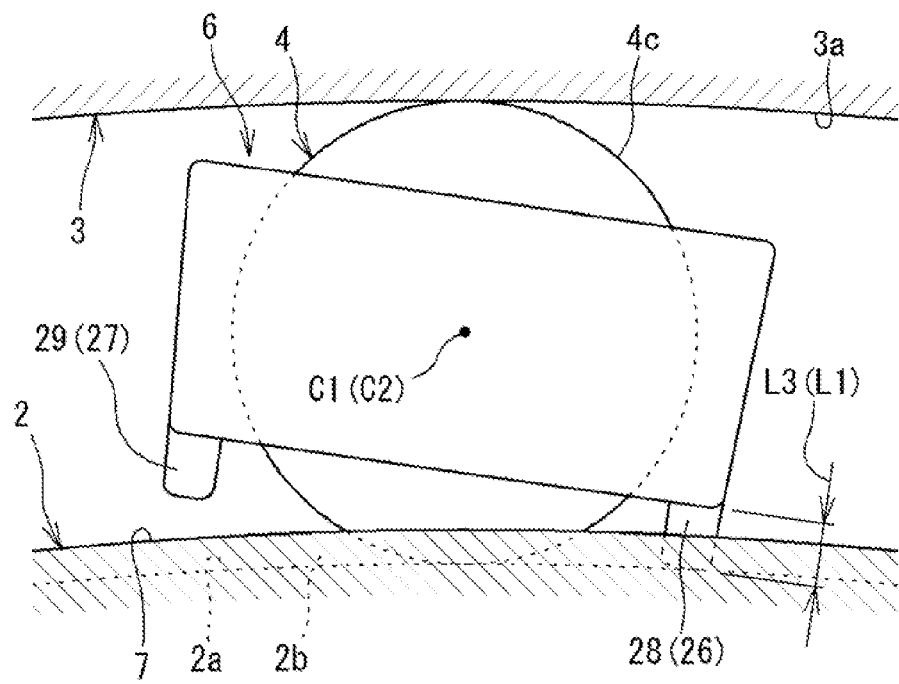
FIG. 11A is a side view illustrating the state where the cage segment according to the second embodiment starts rotating in one direction.

FIG. 11A is a side view illustrating the state where the cage segment 6 according to the present embodiment starts rotating in one direction. As illustrated in FIG. 11A, each of the projecting lengths L1, L3 of the first and third projections 26, 28 is set to such a length that the first and third projections 26, 28 are brought into contact with the inner ring raceway surface 2a when the cage segment 6 starts rotating in one direction (clockwise direction in FIG. 11A) about the axis of the tapered roller 4. Thus, when the cage segment 6 starts rotating in the one direction, the first projection 26 and the third projection 28 are brought into contact with the inner ring raceway surface 2a. As a result, it is possible to prevent the cage segment 6 from further rotating in the one direction.

Figure 11B:
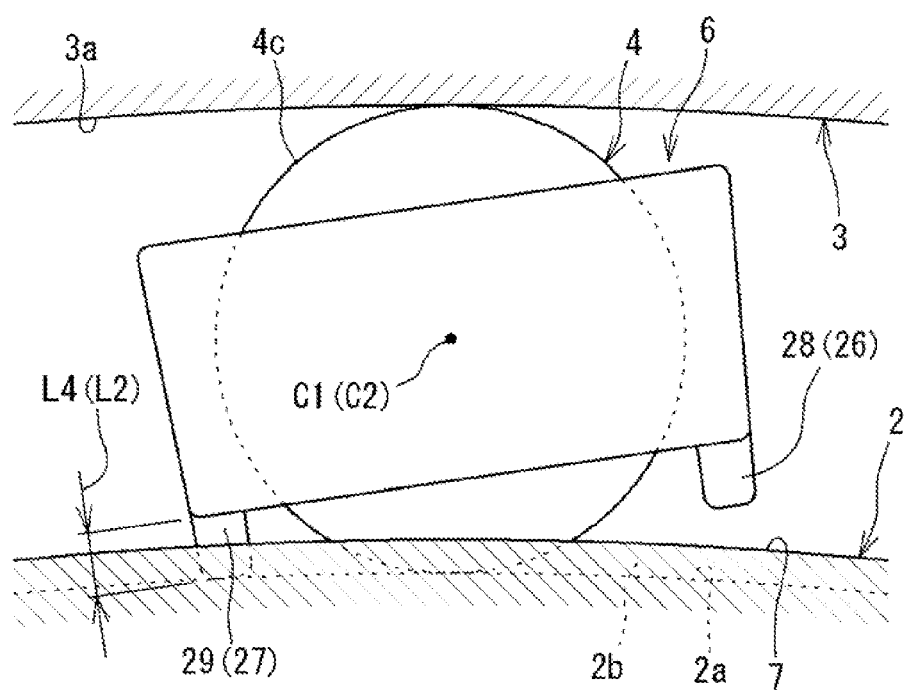
FIG. 11B is a side view illustrating the state where the cage segment according to the second embodiment starts rotating in the other direction.

FIG. 11B is a side view illustrating the state where the cage segment 6 according to the present embodiment starts rotating in the other direction. As illustrated in FIG. 11B, each of the projecting lengths L2, L4 of the second and fourth projections 27, 29 is set to such a length that the second and fourth projections 27, 29 are brought into contact with the inner ring raceway surface 2a when the cage segment 6 starts rotating in the other direction (counterclockwise direction in FIG. 11B) about the axis of the tapered roller 4. Thus, when the cage segment 6 starts rotating in the other direction, the second projection 27 and the fourth projection 29 are brought into contact with the inner ring raceway surface 2a. As a result, it is possible to prevent the cage segment 6 from further rotating in the other direction.

Figure 12:
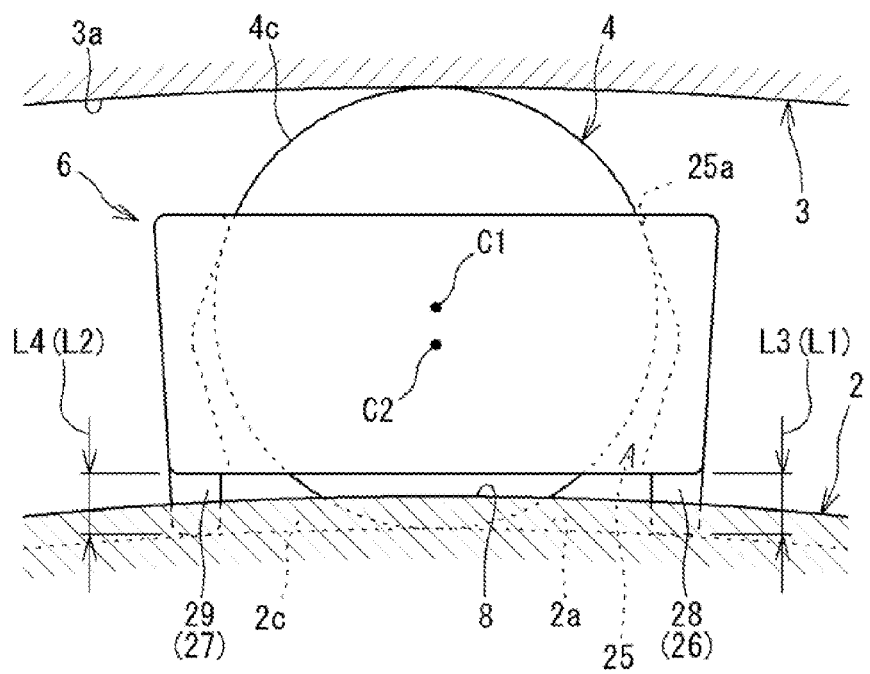
FIG. 12 is a side view illustrating the state where the cage segment according to the second embodiment is displaced radially inward.

FIG. 12 is a side view illustrating the state where the cage segment 6 is displaced radially inward. As illustrated in FIG. 12, each of the projecting lengths L1 to L4 of the first to fourth projections 26 to 29 is set to such a length that the first to fourth projections 26 to 29 are brought into contact with the inner ring raceway surface 2a before the cage segment 6 is detached from the tapered roller 4, when the cage segment 6 is displaced radially inward.

Thus, when the cage segment 6 is displaced radially inward due to, for example, vibrations, the first to fourth projections 26 to 29 are brought into contact with the inner ring raceway surface 2a before the cage segment 6 is detached from the tapered roller 4. As a result, it is possible to prevent the cage segment 6 from being detached from the tapered roller 4 to cause breakage of the cage segment 6. Note that, the features that are not described in the second embodiment are the same as those in the first embodiment.

Figure 13:
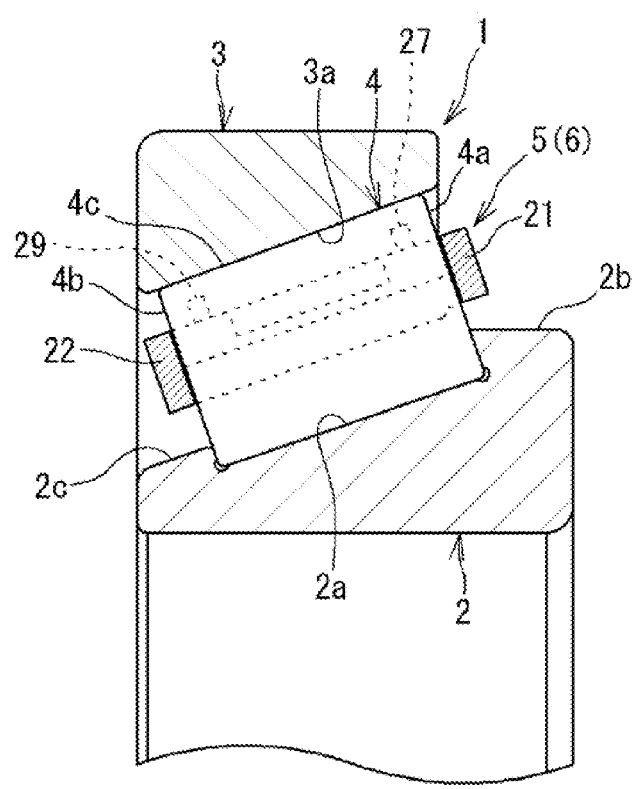
FIG. 13 is a sectional view illustrating main portions of a tapered roller bearing provided with a split cage according to a third embodiment of the invention.
Figure 14:
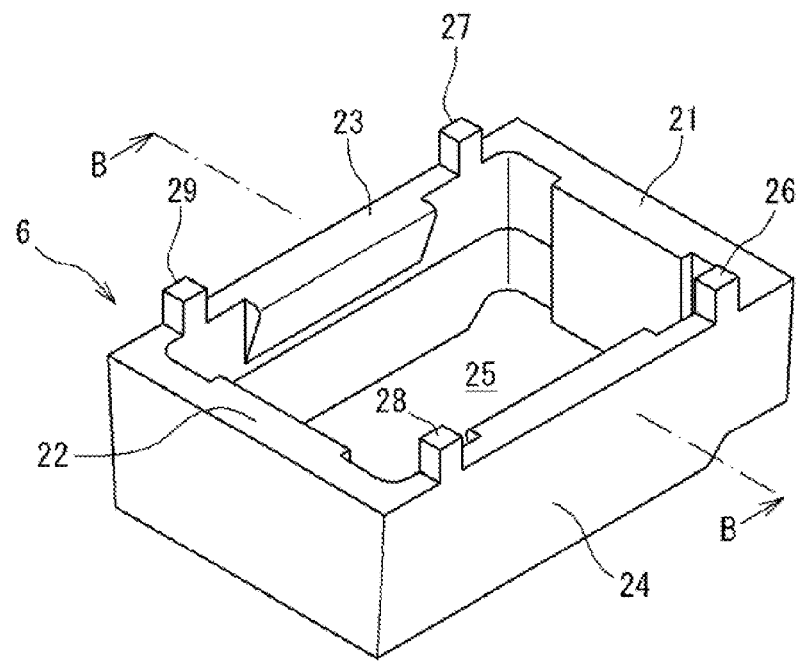
FIG. 14 is a perspective view illustrating one of cage segments that constitute the split cage according to the third embodiment.

FIG. 13 is a sectional view illustrating main portions of a tapered roller bearing 1 provided with a split cage 5 according to a third embodiment of the invention. FIG. 14 is a perspective view illustrating one of cage segments 6 that constitute the split cage 5. In the cage segment 6 according to the present embodiment, first and third projections 26, 28 and second and fourth projections 27, 29 are formed so as to project from the radially outer face of the second cage bar portion 24 and the radially outer face of the first cage bar portion 23, respectively. Specifically, the second projection 27 and the fourth projection 29 that project radially outward are formed integrally with respective longitudinal (axial) end portions of the radially outer face of the first cage bar portion 23. Similarly, the first projection 26 and the third projection 28 that project radially outward are formed integrally with respective longitudinal (axial) end portions of the radially outer face of the second cage bar portion 24.

Figure 15:
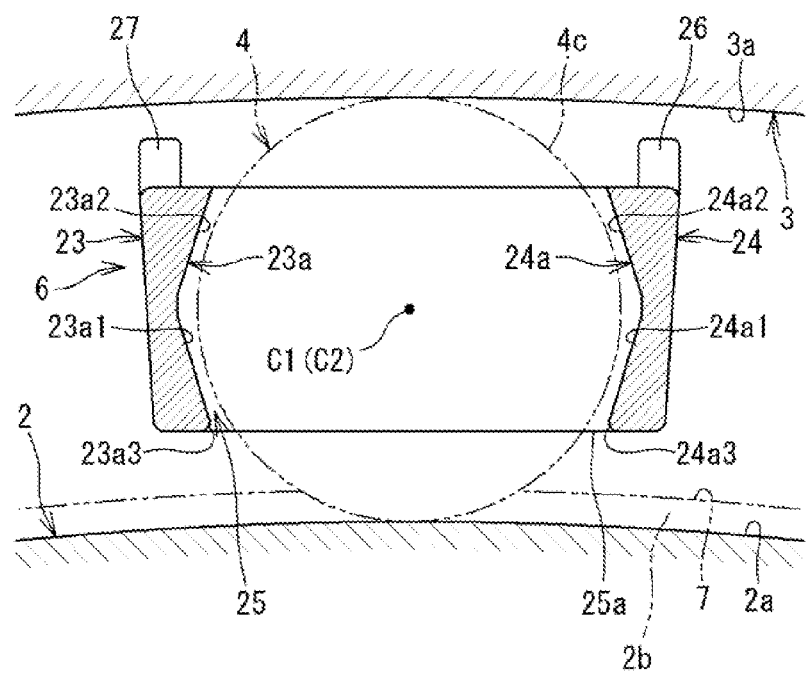
FIG. 15 is a sectional view taken along the line B-B in FIG. 14.

FIG. 15 is a sectional view taken along the line B-B in FIG. 14. As illustrated in FIG. 14 and FIG. 15, an insertion opening 25a is formed at a radially inner side portion of the pocket 25, and the tapered roller 4 is inserted, from the radially inside, into the pocket 25 through the insertion opening 25a. The cage bar portions 23, 24 have pocket-side faces 23a, 24a, respectively, and roundly-chamfered portions 23a3, 24a3 are formed at radially inner end portions of the pocket-side faces 23a, 24a, respectively, to allow the tapered roller 4 to be easily inserted into the pocket 25 through the insertion opening 25a.

Figure 16A:
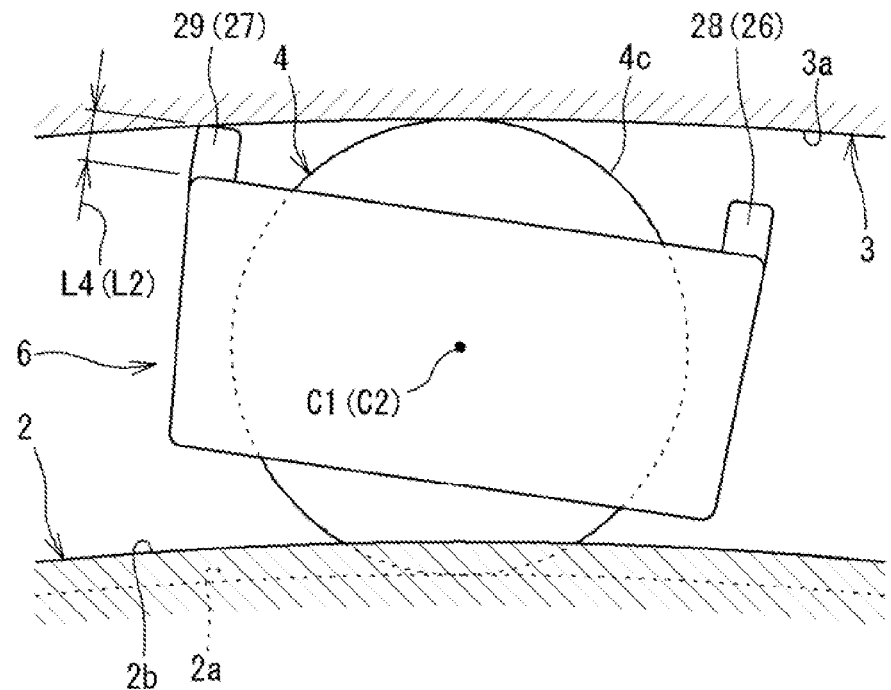
FIG. 16A is a side view illustrating the state where the cage segment according to the third embodiment starts rotating in one direction.

FIG. 16A is a side view illustrating the state where the cage segment 6 according to the present embodiment starts rotating in one direction. As illustrated in FIG. 16A, each of projecting lengths L2, L4 of the second and fourth projections 27, 29 is set to such a length that the second and fourth projections 27, 29 are brought into contact with the outer ring raceway surface 3a when the cage segment 6 starts rotating in one direction (clockwise direction in FIG. 16A) about the axis of the tapered roller 4. Thus, when the cage segment 6 starts rotating in the one direction, the second projection 27 and the fourth projection 29 are brought into contact with the outer ring raceway surface 3a. As a result, it is possible to prevent the cage segment 6 from further rotating in the one direction.

Figure 16B:
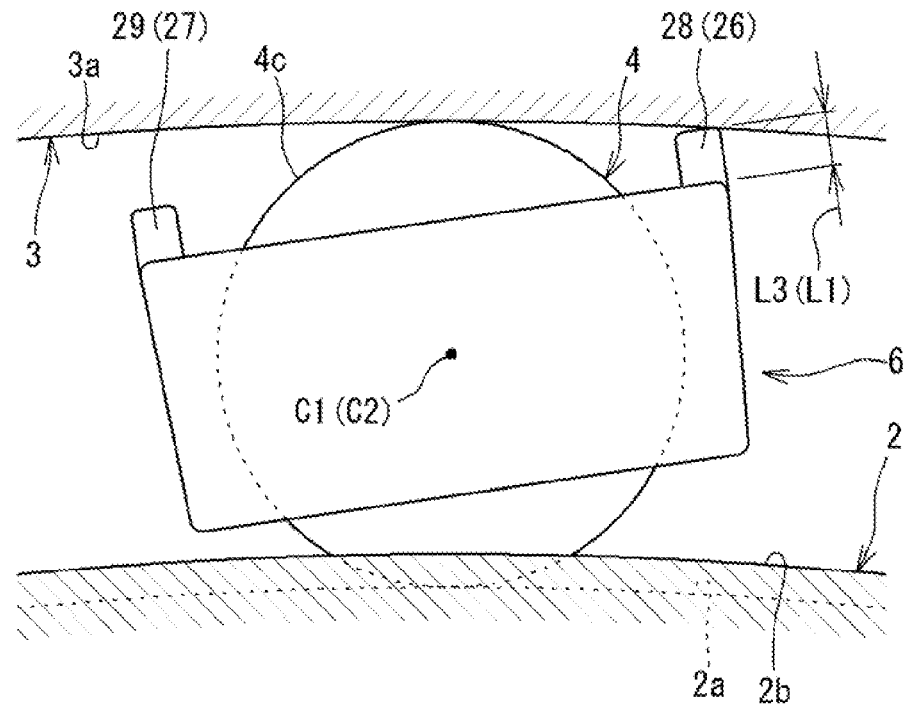
FIG. 16B is a side view illustrating the state where the cage segment according to the third embodiment starts rotating in the other direction.

FIG. 16B is a side view illustrating the state where the cage segment 6 according to the present embodiment starts rotating in the other direction. As illustrated in FIG. 16B, each of projecting lengths L1, L3 of the first and third projections 26, 28 is set to such a length that the first and third projections 26, 28 are brought into contact with the outer ring raceway surface 3a, when the cage segment 6 starts rotating in the other direction (counterclockwise direction in FIG. 16B) about the axis of the tapered roller 4. Thus, when the cage segment 6 starts rotating in the other direction, the first projection 26 and the third projection 28 are brought into contact with the outer ring raceway surface 3a. As a result, it is possible to prevent the cage segment 6 from further rotating in the other direction.

Figure 17:
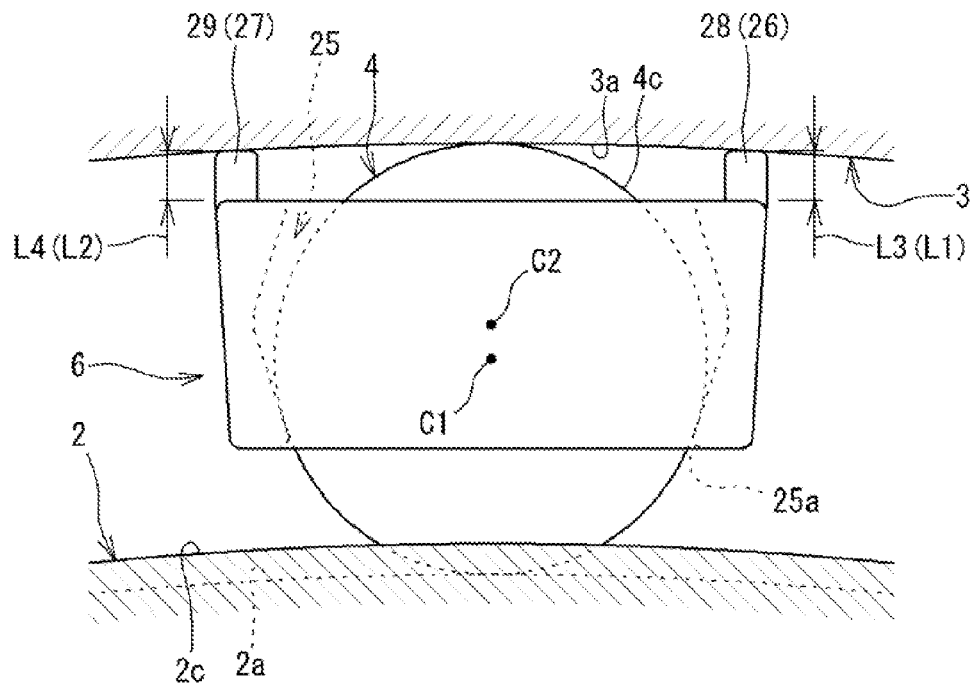
FIG. 17 is a side view illustrating the state where the cage segment according to the third embodiment is displaced radially outward.

FIG. 17 is a side view illustrating the state where the cage segment 6 is displaced radially outward. As illustrated in FIG. 17, each of the projecting lengths L1 to L4 of the first to fourth projections 26 to 29 is set to such a length that the first to fourth projections 26 to 29 are brought into contact with the outer ring raceway surface 3a before the cage segment 6 is detached from the tapered roller 4, when the cage segment 6 is displaced radially outward, that is, when the insertion opening 25a of the pocket 25 is displaced in such a direction that the tapered roller 4 comes out of the insertion opening 25a.

Thus, when the cage segment 6 is displaced radially outward due to, for example, vibrations, the first to fourth projections 26 to 29 are brought into contact with the outer ring raceway surface 3a before the cage segment 6 is detached from the tapered roller 4. As a result, it is possible to prevent the cage segment 6 from being detached from the tapered roller 4 to cause breakage of the cage segment 6. Note that, the features that are not described in the third embodiment are the same as those in the first embodiment.

The invention is not limited to the embodiments described above, and may be implemented in various other embodiments. For example, the first to fourth projections 26 to 29 in the first embodiment (refer to FIG. 3) are formed on the radially inner faces of the first and second rim portions 21, 22. Alternatively, first to fourth projections may be formed on the radially outer faces of the first and second rim portions 21, 22 so as to project radially outward. In this case, as in the third embodiment, the second and fourth projections 27, 29, or the first and third projections 26, 28 are brought into contact with the outer ring raceway surface 3a when the cage segment 6 starts rotating in one direction or in the other direction.

The cage segment 6 in each of the first and second embodiments is provided with the first to fourth projections 26 to 29 to prevent the cage segment 6 from rotating in the one and in the other direction. However, when the cage segment 6 rotates in only the one direction, only the first and third projections 26, 28 may be provided, whereas when the cage segment 6 rotates in only the other direction, only the second and fourth projections 27, 29 may be provided. Similarly, in the cage segment 6 in the third embodiment, when the cage segment 6 rotates in only the one direction, only the second and fourth projections 27, 29 may be provided, whereas when the cage segment 6 rotates in only the other direction, only the first and third projections 26, 28 may be provided.

Figure 18:
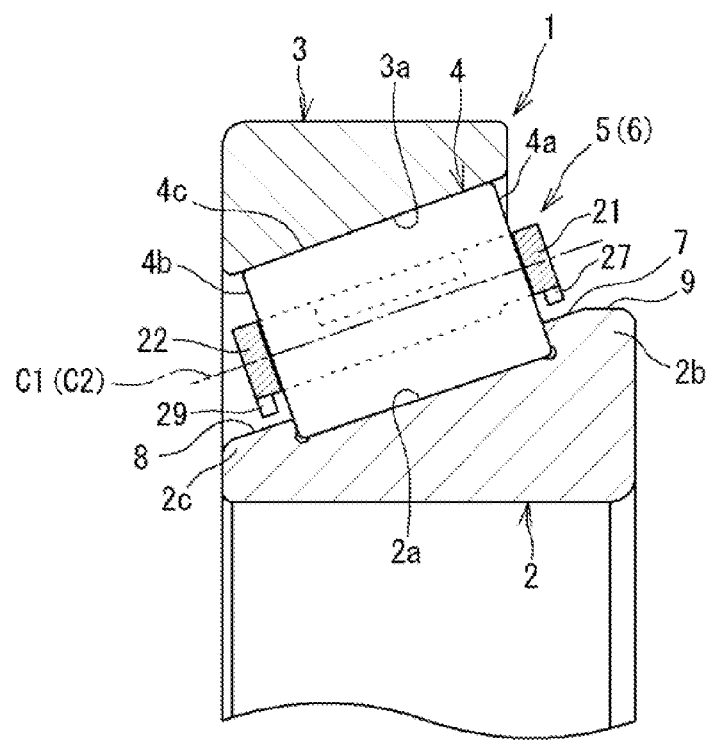
FIG. 18 is a sectional view illustrating main portions of a tapered roller bearing provided with a split cage according to another embodiment of the invention.

FIG. 18 is a sectional view illustrating main portions of a tapered roller bearing provided with a split cage according to another embodiment of the invention. Comparison of the embodiment illustrated in FIG. 18 with the embodiment illustrated in FIG. 1 reveals a difference in shape of a part (large rib portion 2b) of an inner ring 2. A tapered roller bearing 1 illustrated in FIG. 18 includes the inner ring 2, an outer ring 3, a plurality of tapered rollers 4, and a split cage 5. The tapered rollers 4 are rollably disposed in an annular space between the inner ring 2 and the outer ring 3. The split cage 5 holds the tapered rollers 4, and is formed of a plurality of cage segments 6. The cage segments 6 are arranged in a circular pattern along the circumferential direction in the annular space between the inner ring 2 and the outer ring 3 (refer to FIG. 2).

The cage segment 6 is the same as that in the embodiment illustrated in FIG. 1. As illustrated in FIG. 3, each cage segment 6 has a pair of rim portions 21, 22 and a pair of cage bar portions 23, 24. The rim portions 21, 22 face each other at a prescribed distance in the axial direction. The cage bar portions 23, 24 are disposed between the rim portions 21, 22. Each cage segment 6 has a single pocket 25 that accommodates a single tapered roller 4, and that is defined by the rim portions 21, 22, and the cage bar portions 23, 24. Further, projections 26, 27, 28, 29 that project radially inward are respectively formed at four corners of the radially inner face of the cage segment 6.

In the cage segment 6 illustrated in FIG. 18 as well, as described above with reference to FIG. 6A and FIG. 6B, each of the projecting lengths L1, L3 of the projections 26, 28 is set to such a length that the projections 26, 28 are brought into contact with the contact faces 7, 8, which are formed on the outer periphery of the inner ring 2 and toward which the projections 26, 28 project, when the cage segment 6 starts rotating in the one direction. The contact face 7 to be brought into contact with the first projection 26 is the outer peripheral face of the large rib portion 2b. The contact face 8 to be brought into contact with the third projection 28 is the outer peripheral face of the small rib portion 2c. As described above with reference to FIG. 7, each of the projecting lengths L2, L4 of the projections 27, 29 is set to such a length that the projections 27, 29 are brought into contact with the contact faces 7, 8, which are formed on the outer periphery of the inner ring 2 and toward which the projections 27, 29 project, when the cage segment 6 starts rotating in the other direction. The contact face 7 to be brought into contact with the second projection 27 is the outer peripheral face of the large rib portion 2b. The contact face 8 to be brought into contact with the fourth projection 29 is the outer peripheral face of the small rib portion 2c.

Figure 19:
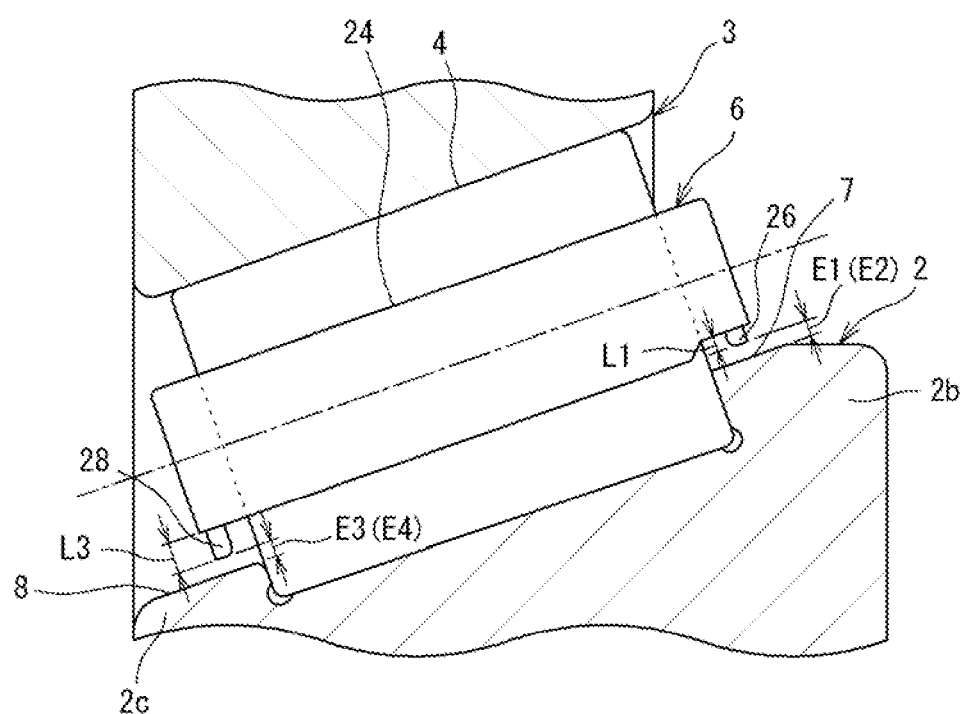
FIG. 19 is an explanatory view illustrating a cage segment and its surroundings as viewed from the circumferential direction.

As illustrated in FIG. 19, the cage segment 6 is provided with two projections 26, 28 that are apart from each other in the axial direction and that are located on one side in the circumferential direction (second cage bar portion 24 side). In addition, the lengths (projecting lengths L1, 13) of the projections 26, 28 are set such that both the projections 26, 28 are brought into contact with the contact faces 7, 8, which are located on respective axial sides of the outer periphery of the inner ring 2, when the cage segment 6 rotates around the axis C2 in the state where an axis C1 of the tapered roller 4 and an axis C2 of the cage segment 6 coincide with each other as illustrated in FIG. 6. That is, the projecting lengths L1, L3 are set such that the projections 26, 28 are simultaneously brought into contact with the contact faces 7, 8, respectively. Therefore, the projecting lengths L1, L3 are set such that a radial clearance E1 between a distal end of the first projection 26 and the contact face 7 is equal to a radial clearance E3 between a distal end of the third projection 28 and the contact face 8, as illustrated in FIG. 19, in the state where the cage segment 6 does not rotate and the axis C1 and the axis C2 coincide with each other. The axis C2 of the cage segment 6 is a straight line positioned at the center of the cage segment 6 alone in the radial direction and at the center of the cage segment 6 alone in the circumferential direction (width direction). More specifically (refer to FIG. 21), the axis C2 of the cage segment 6 is the line of intersection of a first virtual face 43 located at midway between a radially inner face 41 and a radially outer face 42 of a rectangular frame body 40 formed of the pair of rim portions 21, 22, and the pair of cage bar portions 23, 24 of the cage segments 6, and a second virtual face 46 located at midway between a circumferentially outer face 44 of the cage bar portion 23 and a circumferentially outer face 45 of the cage bar portion 24.

The projecting lengths L1, L3 of the projections 26, 28 are set as described above. Thus, when the cage segment 6 rotates in the one direction to bring the projections 26, 28 into contact with the contact faces 7, 8, respectively, as illustrated in FIG. 6A and FIG. 6B, the cage segment 6 is brought into contact with the inner ring 2 at two points, that is, brought into contact with the large rib portion 2b and the small rib portion 2c of the inner ring 2. Thus, the posture the cage segment 6 is stable although the cage segment 6 is tilted. Note that, "the state where the axis C1 of the tapered roller 4 and the axis C2 of the cage segment 6 coincide with each other" means "the state where a pitch circle of a plurality of the tapered rollers 4 arrayed in the circumferential direction coincides with a pitch circle of a plurality of the cage segments 6 arrayed in the circumferential direction to hold the tapered rollers 4 (refer to FIG. 2)". The axis C1 of the tapered roller 4 is the center line of the tapered roller 4, and the axis C2 of the cage segment 6 is the straight line positioned at the center of the cage segment 6 alone in the radial direction at the center of the cage segment 6 alone in the circumferential direction (width direction), as described above.

The cage segment 6 is provided with two projections 27, 29 that are apart from each other in the axial direction and that are located on the other side in the circumferential direction (first cage bar portion 23 side). As illustrated in FIG. 6, the lengths (projecting lengths L2, L4) of the projections 27, 29 are set such that both the projections 27, 29 are brought into contact with the contact faces 7, 8, which are located on respective axial sides of the outer periphery of the inner ring 2, when the cage segment 6 rotates around the axis C2 in the state where the axis C1 of the tapered roller 4 and the axis C2 of the cage segment 6 coincide with each other. That is, the projecting lengths L2, L4 are set such that the projections 27, 29 are simultaneously brought into contact with the contact faces 7, 8, respectively. Therefore, the projecting lengths L2, L4 are set such that a radial clearance E2 between a distal end of the second projection 27 and the contact face 7 is equal to a radial clearance E4 between a distal end of the fourth projection 29 and the contact face 9 in the state where the cage segment 6 does not rotate and the axis C1 and the axis C2 coincide with each other.

The projecting lengths L2, L4 of the projections 27, 29 are set as described above. Thus, when the cage segment 6 rotates in the other direction to bring the projections 27, 29 into contact with the contact faces 7, 8, respectively, as illustrated in FIG. 7A and FIG. 7B, the cage segment 6 is brought into contact with the inner ring 2 at two points, that is, brought into contact with the large rib portion 2b and the small rib portion 2c of the inner ring 2. Thus, the posture the cage segment 6 is stable although the cage segment 6 is tilted. In the present embodiment, the two projections 26, 28 are provided on the second cage bar portion 24 side, and the two projections 27, 29 are provided on the first cage bar portion 23 side. However, the number of the projections provided on the second cage bar portion 24 side may be three or more as long as at least two projections are provided so as to be apart from each other in the axial direction, and the number of the projections provided on the first cage bar portion 23 side may be three or more as long as at least two projections are provided so as to be apart from each other in the axial direction.

Figure 20A:
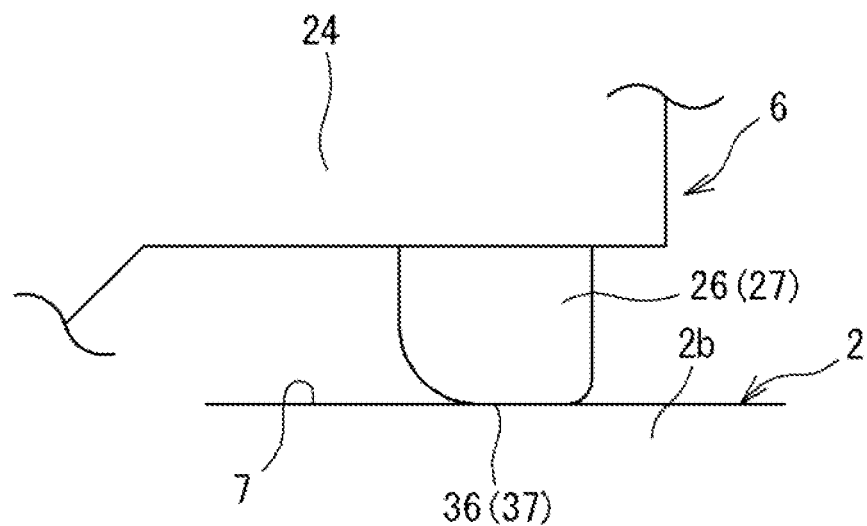
FIG. 20A and FIG. 20B are explanatory views illustrating the state where projections disposed on one side in the circumferential direction are in contact with contact faces.
Figure 20B:
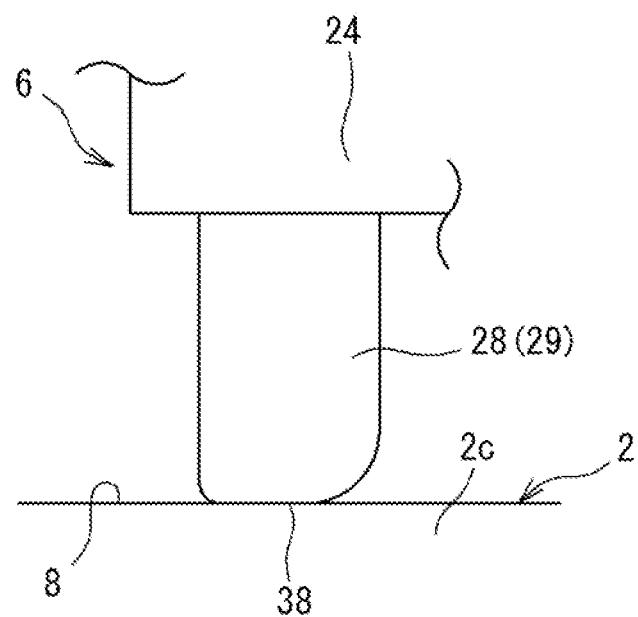

FIG. 20A and FIG. 20B are explanatory views illustrating the state where the first and third projections 26, 28 disposed on one side in the circumferential direction (the second cage bar portion 24 side) are in contact with the contact faces 7, 8. As illustrated in FIG. 20A, a distal end (lower end) 36 of the first projection 26 is formed into a flat face, and the distal end 36 is parallel to the contact face 7. Thus, the first projection 26 is allowed to be brought into line contact with the contact face 7 that is the outer peripheral face of the large rib portion 2b of the inner ring 2. As illustrated in FIG. 20B, a distal end (lower end) 38 of the third projection 28 is formed into a flat face, and the distal end 38 is parallel to the contact face 8. Thus, the third projection 28 is allowed to be brought into line contact with the contact face 8 that is the outer peripheral face of the small rib portion 2c of the inner ring 2.

The same applies to the second and fourth projections 27, 29 disposed on the other side in the circumferential direction (the first cage bar portion 23 side). The second projection 27 has such a shape as to be brought into line contact with the contact face 7 that is the outer peripheral face of the large rib portion 2b of the inner ring 2. The fourth projection 29 has such a shape as to be brought into line contact with the contact face 8 that is the outer peripheral face of the small rib portion 2c of the inner ring 2. As described above, because each of the projections 26, 27, 28, 29 is brought into line contact with a corresponding one of the contact faces 7, 8, when the projections 26, 27, 28, 29 slide with respect to the contact faces 7, 8 due to rotation of the tapered roller bearing 1 in the state where each of the projections 26, 27, 28, 29 are in contact with a corresponding one of the contact faces 7, 8, abrasion of the projections 26, 27, 28, 29 made of resin is restricted.

In order to bring each of the projections 26, 27, 28, 29 into line contact with a corresponding one of the contact faces 7, 8, as illustrated in FIG. 18, the outer peripheral face (contact face 8) of the small rib portion 2c of the inner ring 2 is formed into a tapered face. In addition, the outer peripheral face of the large rib portion 2b of the inner ring 2 has a cylindrical face 9 of which the center line coincides with the axis of the inner ring 2, and the contact face 7 with which the projections 26, 27 are brought into contact, and the contact face 7 is formed into a tapered face. Because each of the contact faces 7, 8 is formed into a tapered face, the distal end of each of the projections 26, 27, 28, 29 is parallel to a corresponding one of the contact faces 7, 8. Thus, each of the projections 26, 27, 28, 29 is brought into line contact with a corresponding one of the contact faces 7, 8, and setting of a clearance between a distal end of each of the projections 26, 27, 28, 29 and a corresponding one of the contact faces 7, 8 is facilitated. Grease is supplied to the inside of the bearing, where the tapered rollers 4 are disposed, from the side where the large rib portion 2b of the inner ring 2 is located. Thus, forming the tapered face (contact face 7) in the outer peripheral face of the large rib portion 2b allows the supplied grease to easily enter the inside of the bearing.

Figure 21:
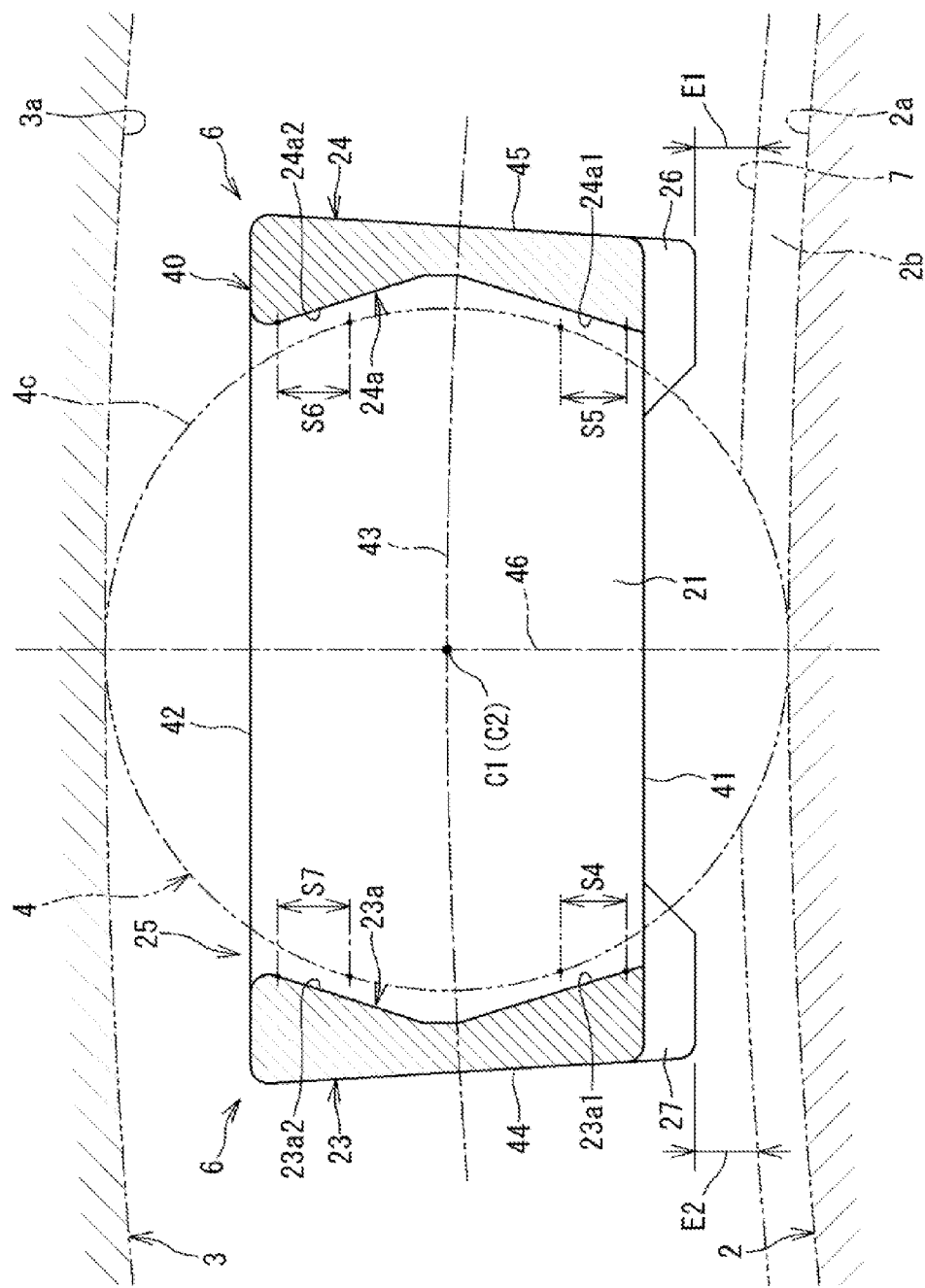
FIG. 21 is a sectional view of the cage segment.

FIG. 21 is a sectional view of the cage segment 6. As described above, a pocket-side side face of the cage bar portion 23 is used as a pocket-side face 23a that can be in sliding contact with the outer peripheral face 4c of the tapered roller 4. Similarly, a pocket-side side face of the cage bar portion 24 is used as a pocket-side face 24a that can be in sliding contact with the outer peripheral face 4c of the tapered roller 4. The pocket-side face 23a has an inner tilted face 23a1 and an outer tilted face 23a2 that is located radially outward of the inner tilted face 23a1. The inner tilted face 23a1 and the outer tilted face 23a2 are allowed to be brought into contact with the outer peripheral face 4c of the tapered roller 4. The pocket-side face 24a has an inner tilted face 24a1 and an outer tilted face 24a2 that is located radially outward of the inner tilted face 24a1. The inner tilted face 24a1 and the outer tilted face 24a2 are allowed to be brought into contact with the outer peripheral face 4c of the tapered roller 4.

As illustrated in FIG. 21, in the state where the axis C1 of the tapered roller 4 and the axis C2 of the cage segment 6 coincide with each other, there is a radial clearance E1 between the contact face 7 with which the first projection 26 is brought into contact and the distal end of the projection 26. In addition, there is a radial clearance E2 between the contact face 7 with which the second projection 27 is brought into contact and the distal end of the projection 27. The state where the radial clearance E1 and the radial clearance E2 are equal to each other is the state where the cage segment 6 does not rotate. Hereinafter, each of the radial clearances E1, E2 that are equal to each other will be referred to as "first radial clearance". In the state where the cage segment 6 does not rotate and the axis C1 and the axis C2 coincide with each other, there is a radial clearance S6 between the outer tilted face 24a2 and the outer peripheral face 4c of the tapered roller 4, and there is a radial clearance S7 between the outer tilted face 23a2 and the outer peripheral face 4c of the tapered roller 4. The radial clearances S6, S7 are equal to each other. Hereinafter, each of the clearances S6, S7 will be referred to as "second radial clearance". In the present embodiment, each of the first radial clearances E1, E2 is set larger than each of the second radial clearances S6, S7 (E1>S6, S7, and E2>S6, S7).

The reason why each of the first radial clearances E1, E2 is set larger than each of the second radial clearances S6, S7 is as follows. In FIG. 21, when the cage segment 6 starts rotating in the one or in the other direction about, for example, the axis C1 as described above, the projection 26 (27) is brought into contact with the contact face 7 toward which the projection 26 (27) projects. As a result, it is possible to prevent the cage segment 6 from further rotating. However, when the cage segment 6 is displaced (parallel displacement) in the radial direction toward the inner ring 2 instead of being rotated, setting each of the first radial clearances E1, E2 larger than each of the second radial clearances S6, S7 prevents the projections 26, 27 from being brought into contact with the contact face 7 before the outer peripheral face 4c of the tapered roller 4 and the outer tilted faces 23a2, 24a2 of the pocket-side faces 23a, 24a are brought into contact with each other. That is, in the state where the cage segment 6 does not rotate greatly, it is possible to maintain "roller guidance" state where each cage segment 6 is positioned in the radial direction by the tapered roller 4.

In contrast to this, if each of the first radial clearances E1, E2 is set smaller than each of the second radial clearances S5, S4, when the cage segment 6 is displaced toward the inner ring 2 by, for example, self-weight, the projections 26, 27 are brought into contact with the contact face 7 that is the outer peripheral face of the large rib portion 2b of the inner ring 2 before the outer tilted faces 23a2, 24a2 are brought into contact with the outer peripheral face 4c of the tapered roller 4, thereby causing "bearing ring guidance (inner ring guidance)" state. However, according to the present embodiment, it is possible to prevent occurrence of the "bearing ring guidance (inner ring guidance)" state. Although not illustrated, but the other two projections 28, 29 disposed on the other side in the axial direction have the same configurations as those of the projections 26, 27. Thus, each of the first radial clearances (E3, E4) between the third and fourth projections 28, 29, and the contact face 8 is set larger than each of the second radial clearances (S6, S7) in the pocket 25 (E3>S5, S4, and E4>S5, S4).

The configurations of various portions in the embodiment described with reference to FIG. 18 to FIG. 21 (e.g., each of the first radial clearances E1, E2, E3, E4 is larger than each of the second radial clearances S6, S7; the projecting lengths L1, L3 (L2, L4) are set such that both of the two projections 26, 28 (27, 29) are (simultaneously) brought into contact with the contact faces 7, 8, respectively, when the cage segment 6 rotates; and each of the projections 26, 27, 28, 29 is brought into line contact with a corresponding one of the contact faces 7, 8) are applicable to the other embodiments described above.

The first to fourth projections 26 to 29 in each of the embodiments described above are provided on one of the radially outer side and the radially inner side of the cage segment 6. However, the projections may be provided on both the radially outer side and the radially inner side of the cage segment 6. In each of the embodiments described above, two projections are formed on each of the rim portions 21, 22 of the cage segment 6, or on each of the cage bar portions 23, 24 of the cage segment 6. However, one projection or three or more projections may be formed on each of the rim portions 21, 22 of the cage segment 6, or on each of the cage bar portions 23, 24 of the cage segment 6. In addition, the invention is also applicable not only to a tapered roller bearing but also to a cylindrical roller bearing.

With the split cage according to the invention, it is possible to prevent the cage segment from being entangled with the roller due to rotation of the cage segment to cause breakage of the cage segment.

What is claimed is:

1. A split cage comprising a plurality of cage segments, each of the cage segments having a pair of rim portions that face each other at a prescribed distance in an axial direction of the split cage, and a pair of cage bar portions disposed between the rim portions to connect the rim portions to each other, the cage bar portions and the rim portions defining a single pocket that accommodates a single roller, wherein:
   the cage segments are arranged in a circular pattern along a circumferential direction of the split cage, in an annular space between an inner ring and an outer ring;
   a circumferential clearance is provided between adjacent cage segments, and radial clearances are formed between each of the cage segments and the inner ring and the outer ring to allow a rotation of each of the cage segments, the rotation of each of the cage segments being guided by the roller;
   each of the cage segments has projections formed so as to project toward at least one of a radially outside and a radially inside, the projections being formed at both the rim portions and the cage bar portions, or at the rim portions or the cage bar portions; and
   a projecting length of each of the projections is set to such a length that the projections are brought into contact with an outer peripheral side portion of the inner ring or an inner peripheral side portion of the outer ring, toward which the projections project, when the cage segment rotates by predetermined degrees.

2. The split cage according to claim 1, wherein each of the projections has such a shape as to be brought into line contact with a contact face toward which the projection projects.

3. A roller bearing comprising:
   an inner ring;
   an outer ring;
   a plurality of rollers rollably disposed in an annular space between the inner ring and the outer ring; and
   the split cage according to claim 1.

4. The roller bearing according to claim 3, wherein:
   each of the rollers is a tapered roller;
   the inner ring has an inner ring raceway surface that is a tapered face on which the tapered rollers roll, and an annular large rib portion that is disposed at a large-diameter-side axial end portion of the inner ring and that projects radially outward; and
   an outer peripheral face of the large rib portion has a cylindrical face having a center line that coincides with an axis of the inner ring, and a tapered face with which the projection is allowed to be brought into contact.

5. The split cage according to claim 1, wherein:
   a pocket-side side face of each of the cage bar portions is a pocket-side face that is allowed to be in sliding contact with an outer peripheral face of the roller; and
   the pocket-side face of each of the cage bar portions has an inner tilted face that is formed so as to be tilted such that part of the inner tilted face except a radially inner end of the pocket-side face is allowed to be in contact with the outer peripheral face of the roller, and an outer tilted face that is formed at a position radially outward of the inner tilted face so as to be tilted such that part of the outer tilted face except a radially outer end of the pocket-side face is allowed to be in contact with the outer peripheral face of the roller.

6. The split cage according to claim 5, wherein:
   the number of the projections is at least two, the at least two projections being disposed apart from each other in the axial direction to be brought into contact with contact faces of the outer peripheral side portion of the inner ring or the inner peripheral side portion of the outer ring, the contact faces being at least on both sides in the axial direction; and
   lengths of the two projections are set such that both of the two projections are brought into contact with the contact faces when the cage segment rotates.

7. The split cage according to claim 6, wherein each of the projections has such a shape as to be brought into line contact with a contact face toward which the projection projects.

8. A roller bearing comprising:
   an inner ring;
   an outer ring;
   a plurality of rollers rollably disposed in an annular space between the inner ring and the outer ring; and
   the split cage according to claim 6.

9. The split cage according to claim 5, wherein each of the projections has such a shape as to be brought into line contact with a contact face toward which the projection projects.

10. A roller bearing comprising:
    an inner ring;
    an outer ring;
    a plurality of rollers rollably disposed in an annular space between the inner ring and the outer ring; and
    the split cage according to claim 5.

11. The roller bearing according to claim 10, wherein:
    each of the rollers is a tapered roller;
    the inner ring has an inner ring raceway surface that is a tapered face on which the tapered rollers roll, and an annular large rib portion that is disposed at a large-diameter-side axial end portion of the inner ring and that projects radially outward; and
    an outer peripheral face of the large rib portion has a cylindrical face having a center line that coincides with an axis of the inner ring, and a tapered face with which the projection is allowed to be brought into contact.

12. The split cage according to claim 1, wherein:
    a pocket-side side face of each of the cage bar portions is a pocket-side face that is allowed to be in sliding contact with an outer peripheral face of the roller;
    the pocket-side face has tilted faces, one of the tilted faces being positioned radially outward of the other one of the tilted faces, the tilted faces being allowed to be in contact with the outer peripheral face of the roller; and in a state where an axis of the roller and an axis of the cage segment coincide with each other, a first radial clearance formed between each of the projections and a contact face with which the projection is brought into contact and toward which the projection projects, is larger than a second radial clearance formed between each of the tilted faces and the outer peripheral face of the roller.

13. The split cage according to claim 12, wherein:

the number of the projections is at least two, the at least two projections being disposed apart from each other in the axial direction to be brought into contact with contact faces of the outer peripheral side portion of the inner ring or the inner peripheral side portion of the outer ring, the contact faces being at least on both sides in the axial direction; and lengths of the two projections are set such that both of the two projections are brought into contact with the contact faces when the cage segment rotates.

14. The split cage according to claim 12, wherein each of the projections has such a shape as to be brought into line contact with a contact face toward which the projection projects.

15. A roller bearing comprising:

an inner ring;

an outer ring;

a plurality of rollers rollably disposed in an annular space between the inner ring and the outer ring; and the split cage according to claim 12.

16. The roller bearing according to claim 15, wherein:

each of the rollers is a tapered roller;

the inner ring has an inner ring raceway surface that is a tapered face on which the tapered rollers roll, and an annular large rib portion that is disposed at a large-diameter-side axial end portion of the inner ring and that projects radially outward; and an outer peripheral face of the large rib portion has a cylindrical face having a center line that coincides with an axis of the inner ring, and a tapered face with which the projection is allowed to be brought into contact.

17. The split cage according to claim 1, wherein:

the number of the projections is at least two, the at least two projections being disposed apart from each other in the axial direction to be brought into contact with contact faces of the outer peripheral side portion of the inner ring or the inner peripheral side portion of the outer ring, the contact faces being at least on both sides in the axial direction; and lengths of the two projections are set such that both of the two projections are brought into contact with the contact faces when the cage segment rotates.

18. The split cage according to claim 17, wherein each of the projections has such a shape as to be brought into line contact with a contact face toward which the projection projects.

19. A roller bearing comprising:

an inner ring;

an outer ring;

a plurality of rollers rollably disposed in an annular space between the inner ring and the outer ring; and the split cage according to claim 17.

20. The roller bearing according to claim 19, wherein:

each of the rollers is a tapered roller;

the inner ring has an inner ring raceway surface that is a tapered face on which the tapered rollers roll, and an annular large rib portion that is disposed at a large-diameter-side axial end portion of the inner ring and that projects radially outward; and an outer peripheral face of the large rib portion has a cylindrical face having a center line that coincides with an axis of the inner ring, and a tapered face with which the projection is allowed to be brought into contact.

* * * * *